INVENTOR.
VLADIMIR J. JANDASEK

Patented Sept. 6, 1949

2,480,933

UNITED STATES PATENT OFFICE 2,480,933

TRANSMISSION

Vladimir J. Jandasek, Detroit, Mich., assignor to Bendix Aviation Corporation, Detroit, Mich., a corporation of Delaware Application October 29, 1945, Serial No. 625,307

3 Claims. (Cl. 74—732)

This invention relates to transmissions, and more particularly to fluid transmissions.

The invention comprehends a transmission including a fluid coupling, a fluid torque converter, a planetary gear system and fluid pressure means for control thereof.

An object of the invention is to provide a transmission including individual fluid drives operative in sequence.

Another object of the invention is to provide a transmission including a fluid coupling, a fluid torque converter and means under control of the converter for locking the coupling and converter together.

Another object of the invention is to provide a transmission including a fluid coupling, a fluid torque converter and a fluid actuated clutch for locking the coupling and converter together for concomitant operation when torque multiplication is no longer required.

Another object of the invention is to provide a transmission including a fluid coupling, a fluid torque converter and means automatically operated by the converter for locking the coupling to the converter for concomitant operation.

Yet another object of the invention is to provide a transmission including a fluid coupling, a fluid torque converter associated therewith, and a fluid actuated clutch for locking the driven element of the converter to the driven element of the coupling when the torque ratio becomes sufficiently high.

A further object of the invention is to provide a transmission including individual fluid power transmitting means for forward drive speeds and a planetary gear for effecting reverse drive.

A further object of the invention is to provide a transmission including separate fluid drive means one ineffective for the transmission of force until the other attains a torque ratio of one-to-one, or less.

Yet a further object of the invention is to provide a transmission including separate fluid power transmitting means at least one of which is ineffective for the delivery of power until the other attains a torque ratio of one-to-one, or less.

Figure 1:
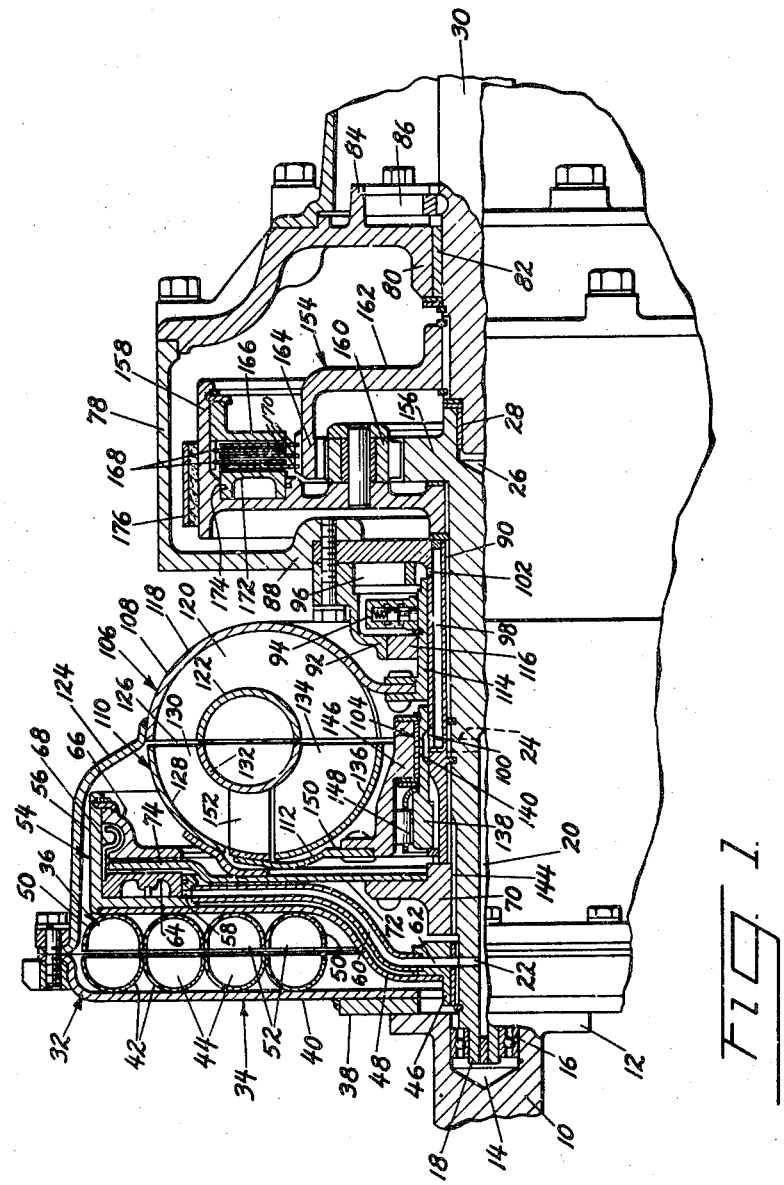
Figure 2:
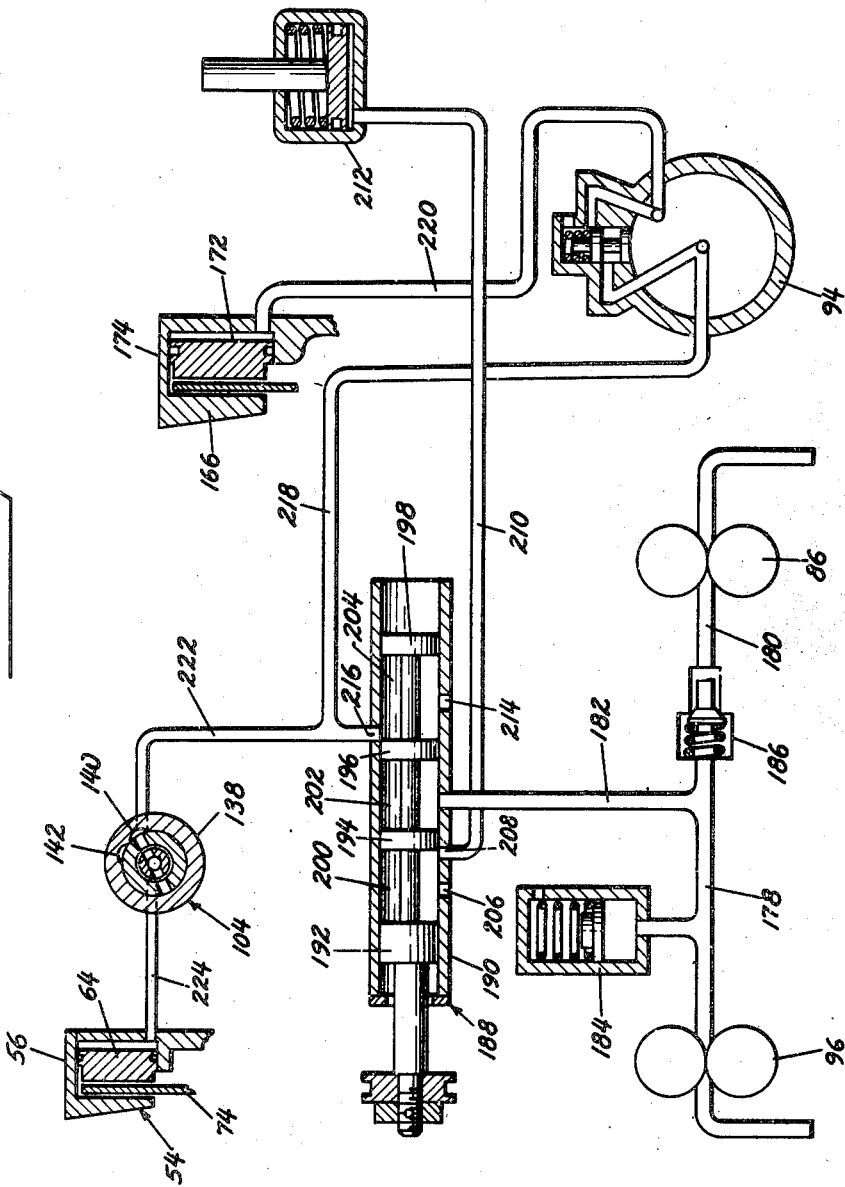

Other objects and advantages of the invention will appear from the following description taken in connection with the drawings forming a part of this specification, and in which:

Fig. 1 is a vertical sectional view of a transmission embodying the invention; and Fig. 2 is a diagrammatical view of a fluid pressure system for control of the transmission.

Referring to the drawings for more specific details of the invention, 10 represents the crankshaft of an internal combustion engine having a flange 12 and an axial recess 14. A bearing 16 fitted in the recess supports a center shaft 18 having an axial passage 20 and diametral passages 22 and 24 communicating with the axial passage. The center shaft also has an axial recess 26, and a bearing 28 fitted in the recess supports a driven shaft 30.

A fluid coupling, indicated generally at 32, includes an impeller 34 and a runner 36. As shown, the impeller includes a hub 38 suitably secured to the flange of the crankshaft 10. The hub supports a web 40 having thereon a plurality of annular shrouds 42 nested one within another. The shrouds are substantially semi-circular in cross-section, and spaced blades 44 are suitably secured in each of the shrouds.

The runner 36 for cooperation with the impeller includes a hub 46 mounted for rotation on the center shaft 18. The hub supports a web 48 having secured thereon a plurality of annular shrouds 50 nested one within another. The shrouds are semi-circular in cross-section, and spaced vanes 52 are secured in each of the shrouds.

A fluid pressure actuated clutch indicated generally at 54 includes an annular cylinder 56 fixedly secured to the web 48 of the runner. The cylinder has a port 58 connected by a tube 60 to a radial passage 62 in the hub 46 in registration with the radial passage 22 in the center shaft, and a piston 64 reciprocable in the chamber of the cylinder and suitably held against rotation therein constitutes an axially movable element of the clutch. The outer wall of the cylinder 56 is extended to provide a support for an annular member 66 overhanging the chamber of the cylinder 56 and the piston 64 therein and constituting a fixed element of the clutch, and this fixed element of the clutch supports a spring 68 effective to return the piston 64 to its retractive position. A hub 70 splined to the center shaft 18 supports a web 72 having an offset flange 74 rotatable between the piston 64 and the fixed element 66 of the clutch.

A stationary housing 78 has an axially disposed hub 80 fitted with a bearing 82 for the reception of the driven shaft 30, and a flange 84 arranged on the hub in concentric relation thereto serves as a housing for a pump 86 suitably connected to the driven shaft. The housing 78 also has a hub 88 oppositely disposed with relation to the hub 80. The hub 88 rigidly supports a sleeve 90 fitted on the center shaft 18, and the hub 88 also supports an auxiliary housing 92 for a governor 94 and a pump 96. The sleeve 90 has therein a passage 98 extended parallel to the axis of the sleeve and radial ports 100 and 102. The port 100 provides a communication between the passage 98 and a valve indicated generally at 104 and the port 102 provides a communication between the passage 98 and the pump 96.

A torque converter indicated generally at 106 includes an impeller 108, a two-stage turbine 110 and a reaction member 112. The impeller has a hub 114 mounted for rotation on the sleeve 90. The hub extends into the auxiliary housing 92. The driving element of the pump 96 is connected to the hub, and a suitable fluid seal 116 is fitted between the hub and the wall of the auxiliary housing. The hub supports a web 118 having secured thereto spaced blades 120 supporting a shroud 122 and the web 118 is secured to a housing 124 bolted or otherwise fastened to the web of the impeller 34 of the fluid coupling 32.

The two-stage turbine 110 provides in conjunction with the impeller a fluid circuit 126. The turbine includes a web 128 suitably supported on the web 72 of the rotatable element of the clutch 54. The web 128 has arranged thereon spaced vanes 130 supporting a shroud 132 which in turn supports spaced vanes 134 having thereon a shroud 136. The vanes 130 constitute the first stage of the turbine and the vanes 134 constitute the second stage of the turbine.

A sleeve 138 mounted for slight angular movement on the sleeve 90 constitutes the movable element of the valve 104. As shown, the sleeve has internal slots 140 and 142. In one position of the sleeve the slot 140 provides a communication between the passage 24 and the port 100 so as to provide for flow of fluid to the clutch 54, and in another position of the sleeve the slot 142 establishes communication between the passage 24 and a passage 144 communicating with the fluid circuit so as to relieve pressure on the fluid in the chamber of the cylinder 56 upon release of the clutch. The valve being controlled through the medium of the reaction member.

The reaction member includes a hub 146 mounted for free rotation in one direction on the sleeve 138 and held against rotation in the reverse direction by means 148 interposed between the sleeve and the hub, and the hub has thereon a web 150 supporting spaced vanes 152 in the circuit 126 between the first and second stages of the turbine.

A planetary gear system indicated generally at 154 is enclosed by the stationary housing 78. As shown, the planetary gear system includes a sun gear 156 integral with the center shaft 18, a drum 158 mounted for free rotation on the center shaft supports planet pinions 160 in mesh with the sun gear 156, and a drum 162 keyed to the driven shaft 30 supports an orbit gear 164 in mesh with the planet pinions 160.

A clutch 166 for locking the planetary gear system includes a plurality of clutch plates 168 carried by the drum 158 interleafed with a plurality of clutch plates 170 carried by the drum 162. The clutch is actuated by a piston 172 reciprocable in a cylinder 174 on the drum 158 so as to lock the drum 162 and orbit gear 164 to the drum 158, and a brake 176 is provided for holding the drum 158, supporting the planet pinions, against movement.

The fluid pressure system for control of the apparatus includes the pumps 86 and 96, the former driven by the driven shaft and the latter driven by the prime mover or the internal combustion engine. The discharge of the pumps are connected by fluid delivery lines 178 and 180 to a branch fluid delivery line 182. The fluid delivery line 178 has connected therein an accumulator 184 and the fluid delivery line 180 has connected therein a check valve 186 for inhibiting retrograde movement of fluid, and the branch fluid delivery line 182 is connected to a manually actuated valve 188.

The valve 188 includes a cylinder 190 having therein a reciprocable piston. The piston has a plurality of spaced lands 192, 194, 196 and 198 providing therebetween chambers 200, 202 and 204. The chamber 200 has a port 206 adapted to be connected to the sump and a port 208 connected by a fluid delivery line 210 to a fluid pressure actuated motor 212 for actuation of the brake 176. The chamber 202 is connected to the fluid delivery line 182, and the chamber 204 has a port 214 adapted to be connected to the sump and a port 216 connected by a fluid delivery line 218 through the governor 94 and fluid delivery line 220 to the fluid pressure means 172 for actuation of the clutch 166. The port 216 is also connected by a fluid delivery line 222 to the valve 104, and the valve is connected in turn by a fluid delivery line 224 to the chamber of the cylinder 56 for actuation of the clutch 54.

In a normal operation, the valve 188 is so set that fluid under pressure may be delivered by the pump 96 through the fluid delivery lines 178 and 182 to the chamber 202 and through the chamber 202, the port 216 and fluid delivery line 218 to the governor 94, thence through the governor and the fluid delivery line 220 to the chamber of the cylinder 174 so as to apply the clutch 166.

Under this condition, power received from the crankshaft 10 of the prime mover flows through the web 40 to the impeller 34, resulting in energization of fluid in the circuit of the fluid coupling and the energy of the fluid is received by the runner 36 causing free rotation thereof. Concomitantly with this operation, power also flows through the housing 124 to the impeller 108 of the torque converter 106, causing rotation of the impeller with the resultant energization of the fluid in the circuit 126. The energy of the fluid is received on the vanes 130 and 134 of the first and second stages of the turbine 110 and also on the vanes 152 of the reaction member 112. This results in rotation of the turbine and the transmission of power with torque multiplication from the turbine to the center shaft and through the center shaft and planetary gear system 154 to the driven shaft 30.

When the torque ratio reaches one-to-one or less, fluid reaction in the circuit 126 of the torque converter results in moving the reaction member 112 and disengagement thereof from the clutch 148, and thereafter the reaction member rotates freely in the circuit. The initial movement of the reaction member causes slight angular movement of the sleeve 138, and this movement of the sleeve opens the valve 104, whereupon fluid under pressure is admitted to the chamber of the cylinder 56, resulting in applying the clutch 54.

When the clutch 54 is applied, the runner 36 of the fluid coupling 32 is locked to the turbine 110 of the torque converter 106, and thereafter the fluid coupling and the torque converter operate in unison. However, the function of the torque converter during this stage of operation is that of a fluid coupling but does not deliver power equal to that of the fluid coupling 32.

With the runner of the fluid coupling and the turbine of the converter locked together, power flows from the runner and the turbine through the web 72 to the center shaft 18, thence through the planetary gear system 154 to the driven shaft.

Upon decrease of speed the direction of fluid flow in the circuit 126 of the converter changes. This results in reverse movement of the reaction member, whereupon the clutch 148 becomes effective to hold the reaction member against movement, and this movement of the reaction member moves the sleeve 138 through a slight angle to close the valve 104. This results in releasing the clutch 54 and the fluid in the cylinder 56 escapes through the port 142 in the valve 104 and returns to the fluid circuit. With the clutch released, the runner of the coupling rotates freely, and, accordingly, does not deliver power.

During this stage of operation, the sole source of power is derived from the converter, and when so operating, should it be found desirable to reverse, the valve 188 is shifted so as to connect the fluid delivery line 210 to the chamber 202. This results in actuation of the motor 212 to apply the brake 176. This shifting of the valve 188 also disrupts communication between the fluid delivery lines 182 and 218 so as release the clutch 166. Under this condition power flows from the converter 106 through the web 72 and centershaft 18 to the planetary gear system 154, which reverses the direction of power flow to the driven shaft 30. The governor 94 releases the pressure on the fluid in the cylinder 174.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising a fluid coupling including an impeller and a runner, a fluid torque converter associated therewith including an impeller, a turbine, and a reaction member freely rotatable in one direction and held against rotation in the reverse direction, a fluid pressure actuated clutch for locking the runner and the turbine together a mechanical transmission connected to the coupling and to the converter, a fluid pressure actuated clutch for the mechanical transmission, a fluid pressure actuated brake for the mechanical transmission, a fluid pressure system connected to the clutches and to the brake, means connected in the system and adapted to be actuated by the reaction member for control of flow of fluid to the clutch for locking the coupling to the converter, means connected in the system for control of the flow of fluid to the clutch of the mechanical transmission and a manually actuated means connected in the system for control of the fluid pressure actuated brake.

2. A transmission comprising a fluid coupling including an impeller and a runner, a fluid torque converter associated therewith including an impeller, a turbine and a reaction member freely rotatable in one direction and held against rotation in the reverse direction, a fluid pressure clutch for locking the runner and the turbine together, a planetary gear system including a sun gear, planet pinions and an orbit gear connected to the turbines of the coupling and the converter, a clutch for locking the planetary system, a fluid pressure system connected to the clutches and to the brake, means connected in the fluid pressure system and actuated by the reaction member for control of the flow of fluid to the clutch for locking the runner and turbine together, speed responsive means connected in the system for control of the clutch for the planetary gear system and a manually actuated valve connected in the system for control of the brake.

3. A transmission for a motor vehicle comprising a fluid coupling including a driving element and a driven element, a torque converter associated therewith including a driving element, a driven element, and a reaction element freely rotatable in one direction and held against rotation in the reverse direction, a clutch connected between the driven elements, a planetary gear system including a sun gear, planet pinions and an orbit gear connecting the driven elements to a driven member, a clutch for locking the planetary gear system for rotation as a single unit, a brake for holding the planet pinions of the planetary gear system, and a fluid pressure system for the transmission including pumps adapted to supply fluid under pressure to the system, an accumulator connected between the pumps for maintaining pressure on the fluid in the system, a manually actuated valve connected to the output of the pumps, conduits connecting the valve to the clutches and the brake, means connected in the conduit of the clutch for locking together the driven elements under control of the reaction element and speed responsive means connected in the conduit of the clutch for the planetary gear.

VLADIMIR J. JANDASEK.

REFERENCES CITED

The following references are of record in the file of this patent:

UNITED STATES PATENTS

| Number | Name | Date |
|---|---|---|
| 838,765 | Bissell | Dec. 18, 1906 |
| 2,093,498 | Walti | Sept. 21, 1937 |
| 2,322,251 | Pollard | June 22, 1943 |
| 2,373,122 | La Brie | Apr. 10, 1945 |